US008153288B2

(12) United States Patent
Sugita et al.

(10) Patent No.: US 8,153,288 B2
(45) Date of Patent: Apr. 10, 2012

(54) FUEL CELL AND FUEL CELL STACK

(75) Inventors: Narutoshi Sugita, Utsunomiya (JP);
Teruyuki Ohtani, Haga-gun (JP);
Shuhei Goto, Utsunomiya (JP); Yosuke Fujii, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1393 days.

(21) Appl. No.: 11/089,877

(22) Filed: Mar. 24, 2005

(65) Prior Publication Data
US 2005/0214627 A1 Sep. 29, 2005

(30) Foreign Application Priority Data

Mar. 24, 2004 (JP) ................................. 2004-086873

(51) Int. Cl.
*H01M 8/02* (2006.01)
*H01M 4/86* (2006.01)
(52) U.S. Cl. ............. 429/35; 429/460; 429/457; 429/522
(58) Field of Classification Search .................... 429/457
See application file for complete search history.

(56) References Cited

U.S. PATENT DOCUMENTS

| 6,503,653 | B2 | 1/2003 | Rock | |
|---|---|---|---|---|
| 6,602,632 | B2 * | 8/2003 | Wakahoi et al. | 429/35 |
| 2002/0086196 | A1 | 7/2002 | Utsunomiya et al. | |
| 2002/0122970 | A1 * | 9/2002 | Inoue et al. | 429/35 |
| 2002/0127461 | A1 * | 9/2002 | Sugita et al. | 429/35 |
| 2003/0087140 | A1 * | 5/2003 | Kikuchi et al. | 429/26 |
| 2003/0224239 | A1 * | 12/2003 | Carlstrom | 429/38 |
| 2004/0115509 | A1 * | 6/2004 | Yoshida et al. | 429/35 |
| 2005/0136306 | A1 * | 6/2005 | Sugiura et al. | 429/26 |

FOREIGN PATENT DOCUMENTS

| EP | 1-009-051 A2 | 6/2000 |
|---|---|---|
| JP | 6-176774 | 6/1994 |
| JP | 2000-173631 | 6/2000 |
| JP | 2002-175818 | 6/2002 |
| JP | 2002-260690 | 9/2002 |
| JP | 2002-358975 | 12/2002 |
| JP | 2003-338295 | 11/2003 |

OTHER PUBLICATIONS

Japanese Office Action for Application No. 2004-086873, dated Feb. 6, 2007.

* cited by examiner

*Primary Examiner* — Ula C. Ruddock
*Assistant Examiner* — Alix Echelmeyer
(74) *Attorney, Agent, or Firm* — Nelson Mullins Riley & Scarborough LLP; Anthony A. Laurentano (57) ABSTRACT

A fuel cell is formed by stacking a membrane electrode assembly and separators alternately. Each of the separators includes first and second metal plates. A coolant flow field is formed between the first metal plate of the fuel cell and the second metal plate of the adjacent fuel cell. A folded section is provided around a coolant supply passage by folding the second metal plate. The folded section forms an inlet which enlarges the sectional area of an opening as a fluid passage between the coolant supply passage and the coolant flow field.

3 Claims, 11 Drawing Sheets

FUEL CELL AND FUEL CELL STACK

BACKGROUND OF THE INVENTION

1. Field of the Invention

The present invention relates to a fuel cell and a fuel cell stack formed by stacking a plurality of the fuel cells. Each fuel cell is formed by sandwiching an electrolyte electrode assembly between metal separators. The electrolyte electrode assembly includes a pair of electrodes, and an electrolyte interposed between the electrodes.

2. Description of the Related Art

For example, a solid polymer electrolyte fuel cell employs a polymer ion exchange membrane as a solid polymer electrolyte membrane. The solid polymer electrolyte membrane is interposed between an anode and a cathode to form a membrane electrode assembly. Each of the anode and the cathode is made of electrode catalyst and porous carbon. The membrane electrode assembly is sandwiched between separators (bipolar plates) to form the fuel cell. In use, generally, a predetermined number of the fuel cells are stacked together to form a fuel cell stack.

In the fuel cell, a fuel gas (reactant gas) such as a gas chiefly containing hydrogen (hereinafter also referred to as the hydrogen-containing gas) is supplied to the anode. An oxidizing gas (reactant gas) such as a gas chiefly containing oxygen (hereinafter also referred to as the oxygen-containing gas) is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In the fuel cell, for example, a metal plate is used for fabricating the separator. The strength of the metal separator is high in comparison with a carbon separator, and the metal plate is suitable for fabricating a thin separator. The metal separator with corrugated surfaces including protrusions and grooves which define reactant gas flow fields having the desired shape is fabricated by press forming in order to reduce the thickness of the metal separator, and to achieve reduction in the overall size and weight of the fuel cell.

In the press forming process of the metal separator, bending forming or roll forming is performed. Therefore, residual stress exists in the metal separator. After press forming, undesirable deformation such as warpage or distortion may occur in the metal separator. Therefore, the uniform surface pressure distribution in the electrode surface or the sealing surface may not be achieved at the time of stacking the metal separator and the other components of the fuel cell. Thus, the power generation performance or the sealing performance is lowered undesirably.

Figure 11:
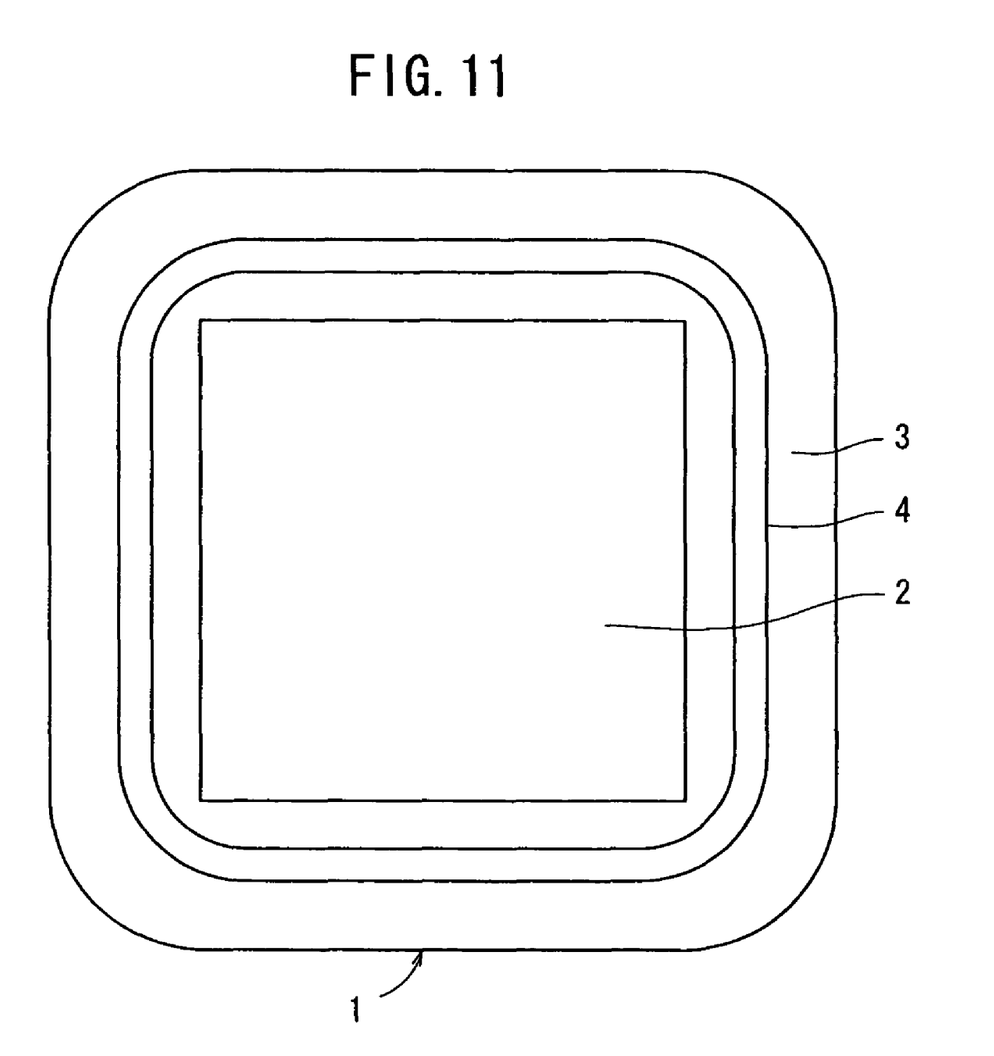
FIG. 11 is a view showing a conventional separator for a fuel cell.

As the conventional technique which is aimed to address the problem, for example, a fuel cell as disclosed in Japanese Laid-Open Patent Publication No. 2002-175818 is known. In the conventional technique, as shown in FIG. 11, a separator 1 is fabricated by press forming using one metal plate. The separator 1 includes a current collector region 2 and a marginal region 3 around the current collector region 2. The current collector region 2 has a corrugated surface including grooves forming a gas flow field and protrusions which contact an electrode assembly. A rib 4 is formed along the entire circumference of the marginal region 3.

As described above, since the rib 4 is formed in the marginal region 3 of the separator 1, in comparison with the case in which the marginal region 3 has a flat surface, the rigidity of the marginal region 3 is increased greatly. Even if the separator 1 is a thin plate, deformation such as warpage after press forming is effectively suppressed.

Internal manifold structure is widely adopted in the fuel cell. In the internal manifold structure, fluid supply passages and fluid discharge passages extend though separators in the stacking direction. The fuel gas, the oxygen-containing gas, and the coolant are supplied from the respective fluid supply passages into the fuel gas flow field, the oxygen-containing gas flow field, and the coolant flow field, and then, the fuel gas, the oxygen-containing gas, and the coolant are discharged into the respective fuel gas discharge passages.

Therefore, for example, as the gas supply passages and the gas discharge passages, six fluid passages extend though the separators in the stacking direction. If the separator is a metal thin plate, the rigidity of the portion around the fluid passage is very low. Therefore, deformation occurs easily in the position near the fluid passage. The uniform surface pressure may not be achieved at the time of stacking the separator and the other components of the fuel cell.

SUMMARY OF THE INVENTION

A main object of the present invention is to provide a fuel cell and a fuel cell stack formed by stacking a plurality of the fuel cells, each fuel cell including a metal separator of a thin plate having a fluid passage in which, with simple structure, the rigidity of the metal separator is maintained, and deformation of the metal separator is prevented desirably.

The present invention relates to a fuel cell formed by stacking an electrolyte electrode assembly and a metal separator in a stacking direction. The electrolyte electrode assembly includes a pair of electrodes, and an electrolyte interposed between the electrodes.

A fluid passage extends through the metal separator in the stacking direction for allowing at least fluid comprising a reactant gas or a coolant to flow through the fluid passage. A folded section is provided around the fluid passage, and the folded section is formed by folding the metal separator in the stacking direction.

It is preferable that a plurality of fluid passages are arranged at an end of the metal separator, and the folded section is provided at least around the fluid passage at a middle position or near a middle position.

Further, it is preferable that the direction of folding the metal separator for forming the folded section is determined such that the sectional area of an opening as a fluid passage of the fluid flowing along a surface of the metal separator is enlarged.

The present invention further relates to a fuel cell stack comprising at least two fuel cells, the fuel cells each formed by stacking an electrolyte electrode assembly and a pair of metal separators, the electrolyte electrode assembly interposed between the metal separators, the electrolyte electrode assembly including a pair of electrodes, and an electrolyte interposed between the electrodes, a fluid passage extending through the metal separators in a stacking direction for allowing at least fluid comprising a reactant gas or a coolant to flow through the fluid passage. A coolant flow field is formed between a metal separator of one of the fuel cells and an adjacent metal separator of another one of the fuel cells, and a folded section is formed by folding the metal separator of the one of the fuel cells, and another folded section is formed by folding the adjacent metal separator. The folding sections are provided around the fluid passage and folded in directions away from a contact plane between the metal separators adjacent to each other.

In the present invention, the folded section is provided around the fluid passage of the metal separator. With the simple structure, the rigidity of the portion around the fluid passage is increased. Therefore, reduction in the thickness of the metal separator is achieved, and undesirable deformation such as warpage or distortion after press forming of the metal separator is reduced. Thus, the uniform surface pressure distribution at the time of stacking the metal separator and the other components of the fuel cell is achieved. The power generation performance and the sealing performance are improved. Further, the overall size and weight of the fuel cell are reduced effectively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
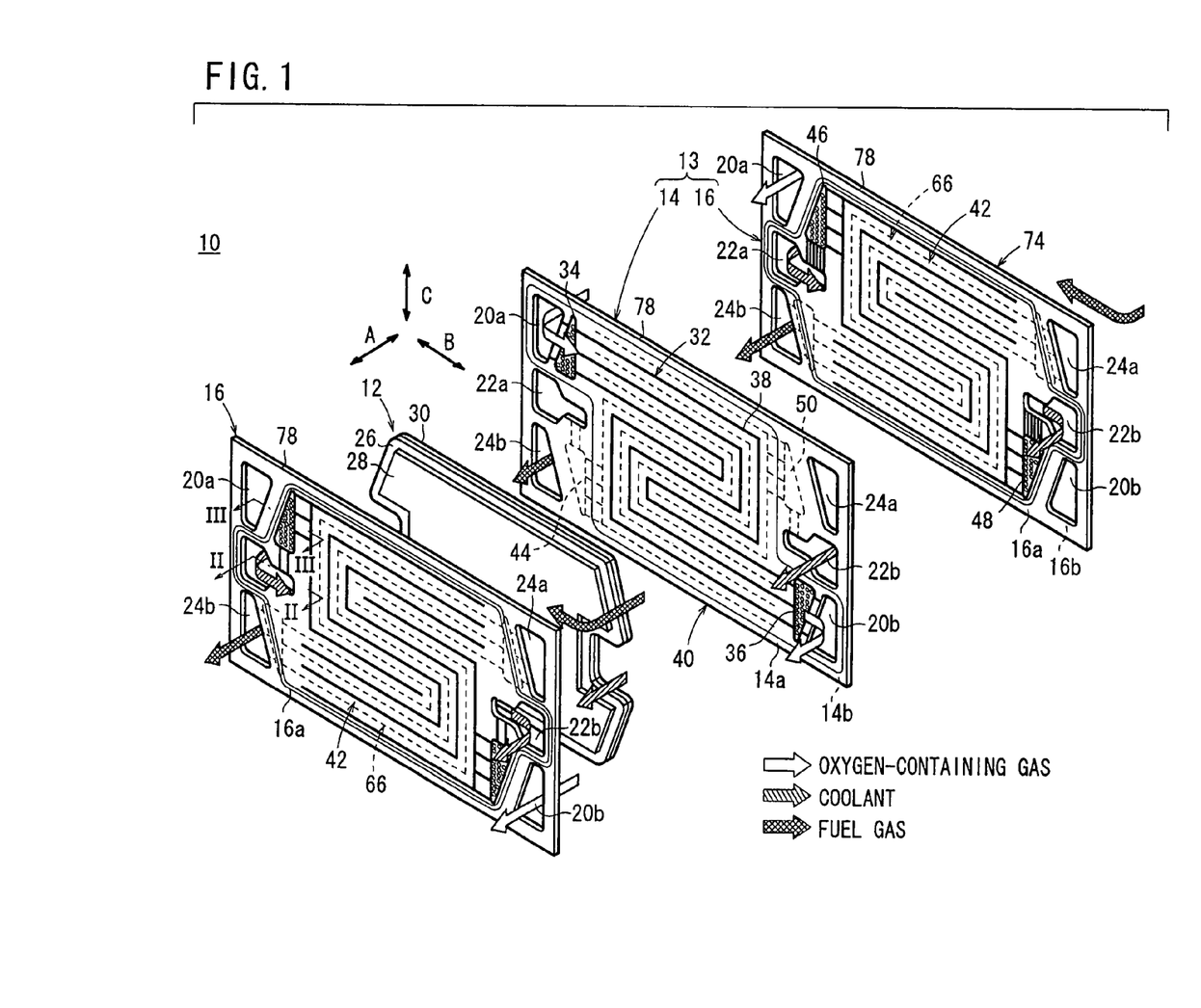
FIG. 1 is an exploded perspective view showing main components of a fuel cell according a first embodiment of the present invention.
Figure 2:
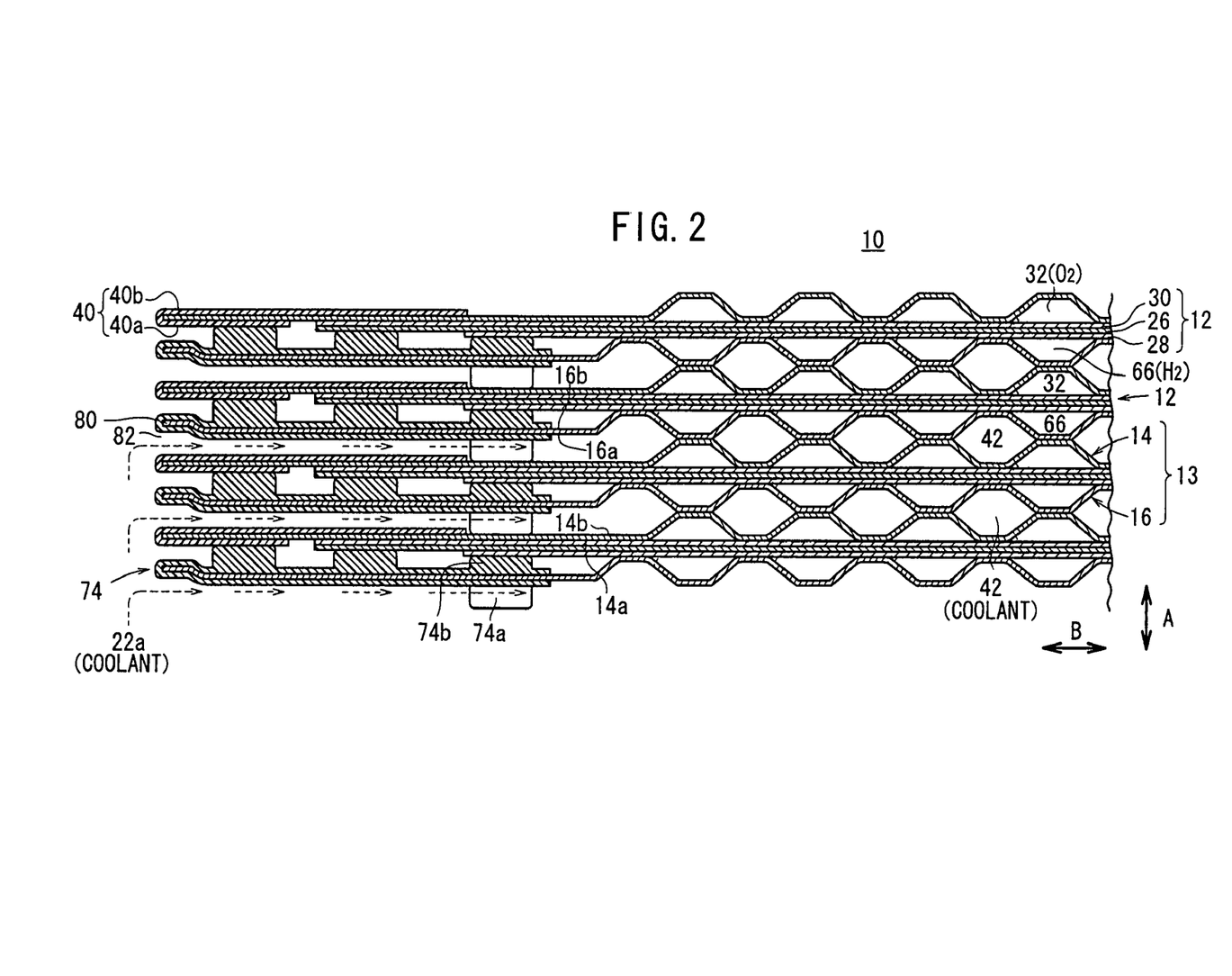
FIG. 2 is a cross sectional view showing a stack formed by stacking a plurality of the fuel cells, taken along a line II-II in FIG. 1.
Figure 3:
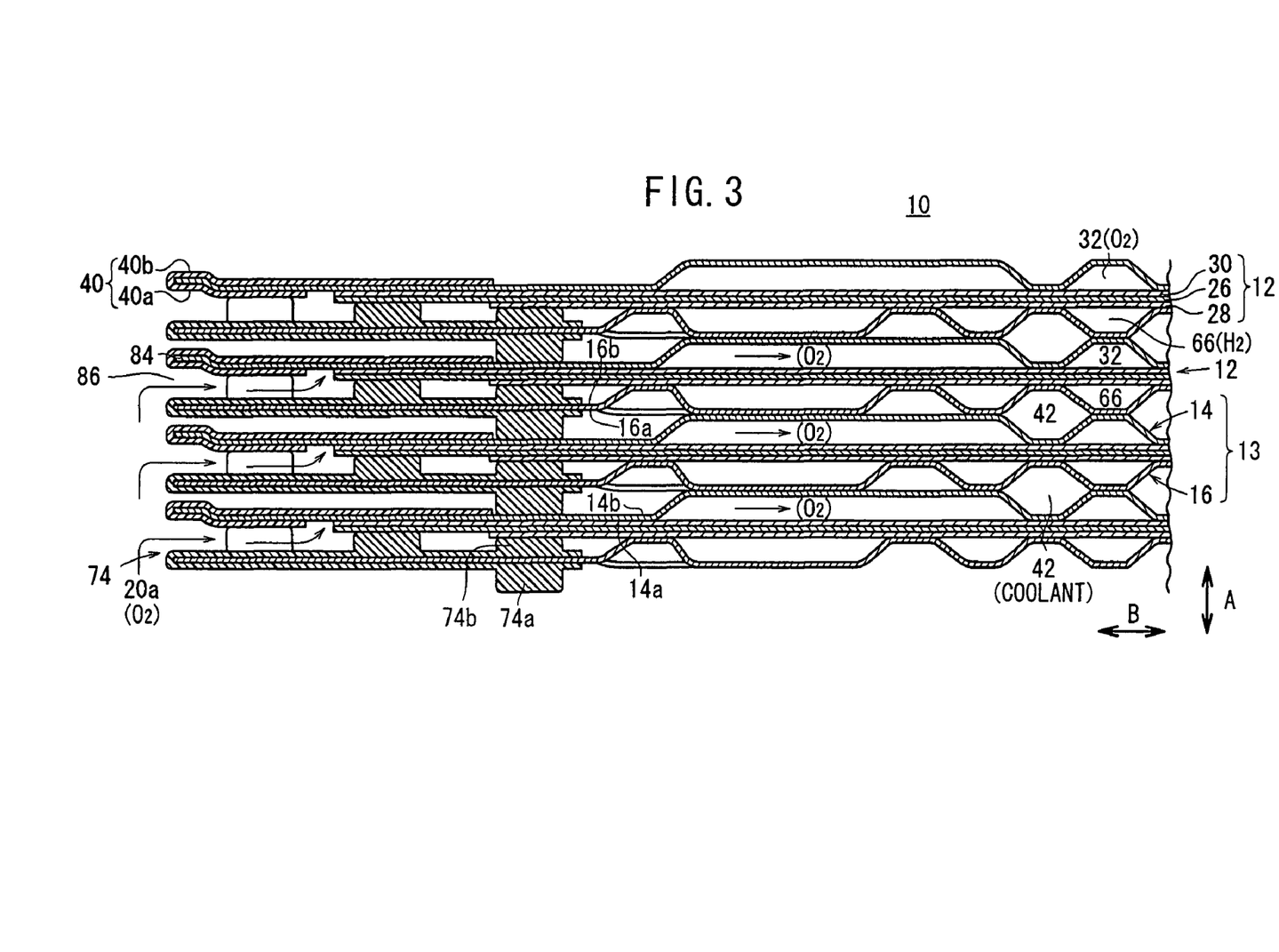
FIG. 3 is a cross sectional view showing the stack, taken along a line III-III in FIG. 1.

FIG. 1 is an exploded perspective view showing main components of a fuel cell 10 according to a first embodiment of the present invention. FIG. 2 is a cross sectional view showing a stack formed by stacking a plurality of the fuel cells 10, taken along a line II-II in FIG. 1. FIG. 3 is a cross sectional view showing the stack, taken along a line III-III in FIG. 1.

The fuel cell 10 is formed by stacking a membrane electrode assembly (electrolyte electrode assembly) 12 and separators 13 alternately. Each of the separators 13 includes first and second metal plates 14, 16, which are stacked together.

As shown in FIG. 1, at one end of the fuel cell 10 in a direction indicated by an arrow B, an oxygen-containing gas supply passage 20a for supplying an oxygen-containing gas (reactant gas), a coolant supply passage 22a for supplying a coolant, and a fuel gas discharge passage 24b for discharging a fuel gas (reactant gas) such as a hydrogen-containing gas are arranged vertically in a direction indicated by an arrow C. The oxygen-containing gas supply passage 20a, the coolant supply passage 22a, and the fuel gas discharge passage 24b extend through the fuel cell 10 in a stacking direction indicated by an arrow A.

At the other end of the fuel cell 10 in the direction indicated by the arrow B, a fuel gas supply passage 24a for supplying the fuel gas, a coolant discharge passage 22b for discharging the coolant, and an oxygen-containing gas discharge passage 20b for discharging the oxygen-containing gas are arranged vertically in the direction indicated by the arrow C. The fuel gas supply passage 24a, the coolant discharge passage 22b, and the oxygen-containing gas discharge passage 20b extend through the fuel cell 10 in the direction indicated by the arrow A.

Figure 4:
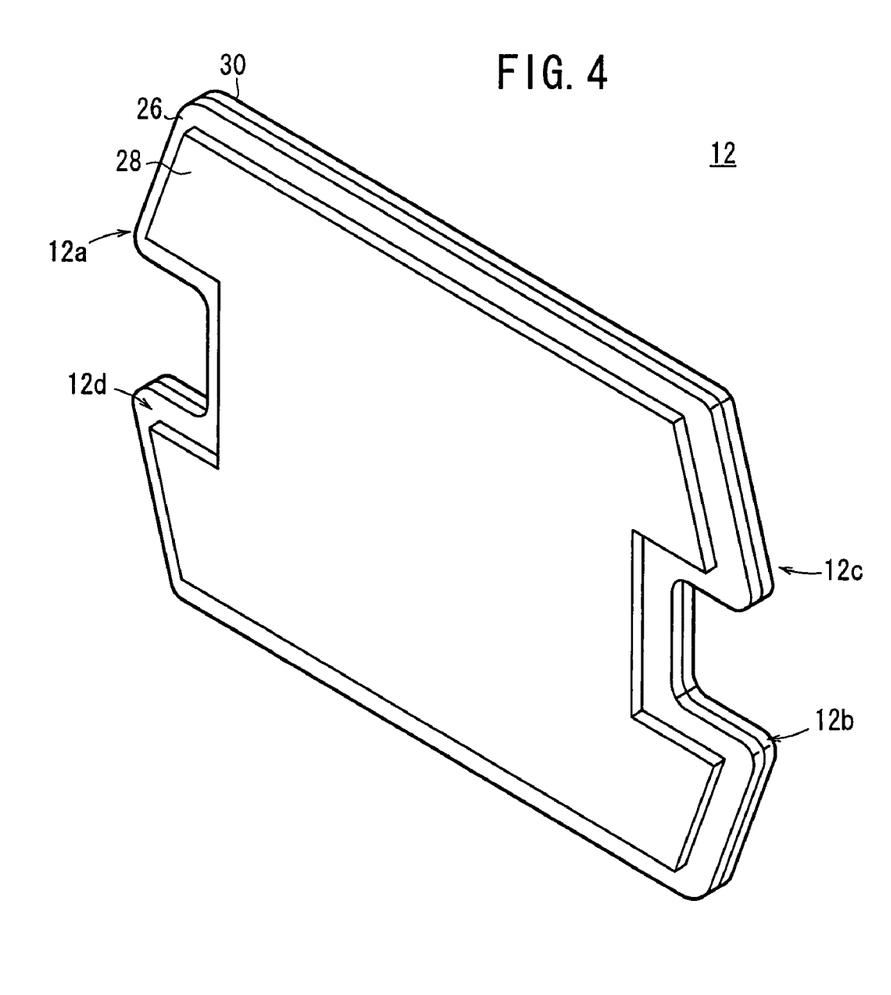
FIG. 4 is a perspective view showing a membrane electrode assembly of the fuel cell according to the embodiment of the present invention.

As shown in FIGS. 1 and 4, the membrane electrode assembly 12 comprises an anode 28, a cathode 30, and a solid polymer electrolyte membrane (electrolyte) 26 interposed between the anode 28 and the cathode 30. The solid polymer electrolyte membrane 26 is formed by impregnating a thin membrane of perfluorosulfonic acid with water, for example. The surface area of the anode 28 is smaller than the surface area of the cathode 30. The cathode 30 is provided over the entire surface of the solid polymer electrolyte membrane 26.

Each of the anode 28 and cathode 30 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 28 and the electrode catalyst layer of the cathode 30 are fixed to both surfaces of the solid polymer electrolyte membrane 26, respectively.

The membrane electrode assembly 12 has a substantially rectangular shape as a whole. The membrane electrode assembly 12 includes four extensions 12a through 12d extending outwardly. The extensions 12a through 12d are provided at four corners, i.e., at diagonal positions of the membrane electrode assembly 12. Each of the extensions 12a through 12d has a substantially triangular shape having an oblique tip end corresponding to the shape of buffers as described later.

Figure 5:
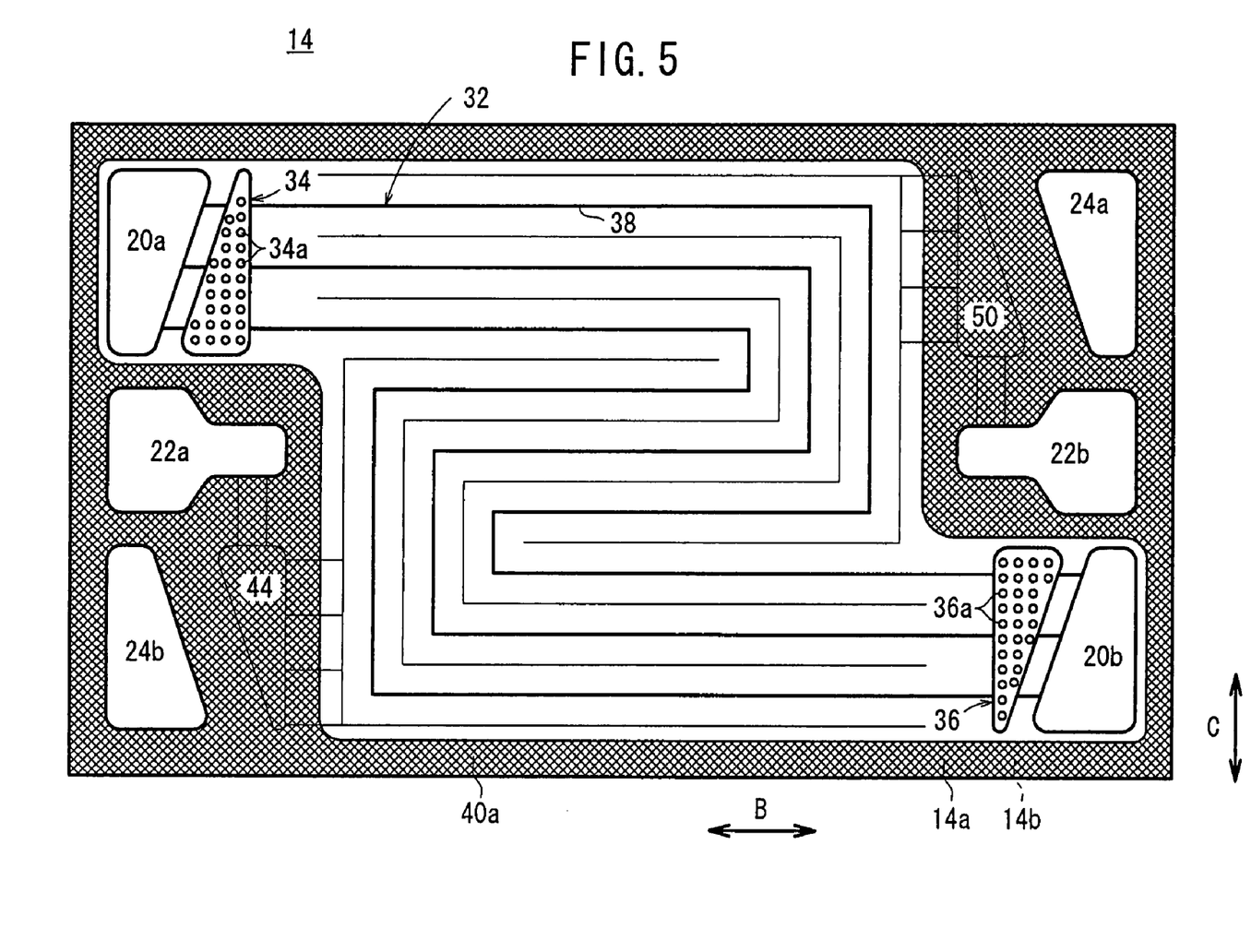
FIG. 5 is a view showing one surface of a first metal plate of the fuel cell.

As shown in FIGS. 1 and 5, the first metal plate 14 has an oxygen-containing flow field 32 on its surface 14a facing the membrane electrode assembly 12. The oxygen-containing gas flow field 32 is connected between the oxygen-containing gas supply passage 20a and the oxygen-containing gas discharge passage 20b. The oxygen-containing gas flow field 32 includes a substantially right triangular inlet buffer 34 provided near the oxygen-containing gas supply passage 20a, and a substantially right triangular outlet buffer 36 provided near the oxygen-containing gas discharge passage 20b. The inlet buffer 34 and the outlet buffer 36 are substantially symmetrical with each other, and include a plurality of bosses 34a, 36a, respectively.

The inlet buffer 34 and the outlet buffer 36 are connected by a plurality of oxygen-containing gas flow grooves 38 of the oxygen-containing gas flow field 32. The oxygen-containing gas flow grooves 38 extend in parallel with each other in a serpentine pattern for allowing the oxygen-containing gas to flow back and forth in the direction indicated by the arrow B, and flow in the direction indicated by the arrow C.

The oxygen-containing gas flow grooves 38 are serpentine grooves having an even number of, e.g., two turn regions in the surface 14a of the first metal plate 14. The width of the extensions 12a, 12b of the membrane electrode assembly 12 is substantially the same as the width of the turn regions of the serpentine grooves.

On the surface 14a of the first metal plate 14, a planar seal 40a is formed around the oxygen-containing gas supply passage 20a, the oxygen-containing gas discharge passage 20b, and the oxygen-containing gas flow field 32 for preventing leakage of the oxygen-containing gas.

Figure 6:
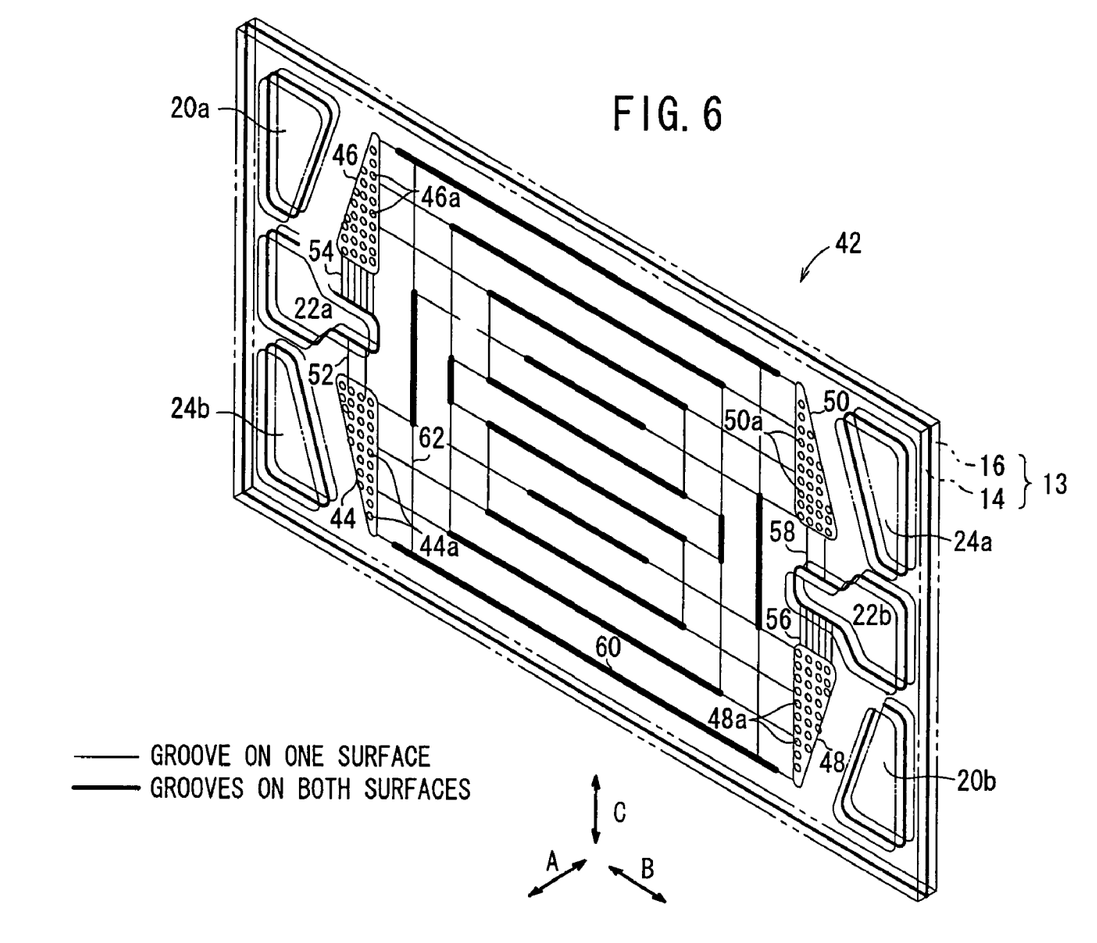
FIG. 6 is a perspective view showing a coolant flow field formed in a separator.

A surface 14b of the first metal plate 14 faces a surface 16a of the second metal plate 16, and a coolant flow field 42 is formed between the surface 14b of the first metal plate 14 and the surface 16a of the second metal plate 16. As shown in FIG. 6, for example, substantially triangular first and second inlet buffers 44, 46 and substantially triangular first and second outlet buffers 48, 50 are provided in the coolant flow field 42. The first and second inlet buffers 44, 46 are provided on opposite sides of the coolant supply passage 22a in the direction indicated by the arrow C, and the first and second outlet buffers 48, 50 are provided on opposite sides of the coolant discharge passage 22b in the direction indicated by the arrow C.

The first inlet buffer 44 and the second outlet buffer 50 are substantially symmetrical with each other, and the second inlet buffer 46 and the first outlet buffer 48 are substantially symmetrical with each other. The first inlet buffer 44, the second inlet buffer 46, the first outlet buffer 48, and the second outlet buffer 50 include a plurality of bosses 44a, 46a, 48a, and 50a, respectively.

The coolant supply passage 22a is connected to the first inlet buffer 44 through first inlet connection grooves 52, and connected to the second inlet buffer 46 through second inlet connection grooves 54. The coolant discharge passage 22b is connected to the first outlet buffer 48 through first outlet connection grooves 56, and connected to the second outlet buffer 50 through second outlet connection grooves 58.

The coolant flow field 42 comprises a plurality of straight flow grooves 60 extending in the direction indicted by the arrow B, and a plurality of straight flow grooves 62 extending in the direction indicated by the arrow C. The coolant flow field 42 is partially defined by grooves on the surface 14b of the first metal plate 14, and partially defined by grooves on the surface 16a of the second metal plate 16. The coolant flow field 42 is formed between the first metal plate 14 and the second metal plate 16 when the first metal plate 14 and the second metal plate 16 are stacked together.

Figure 7:
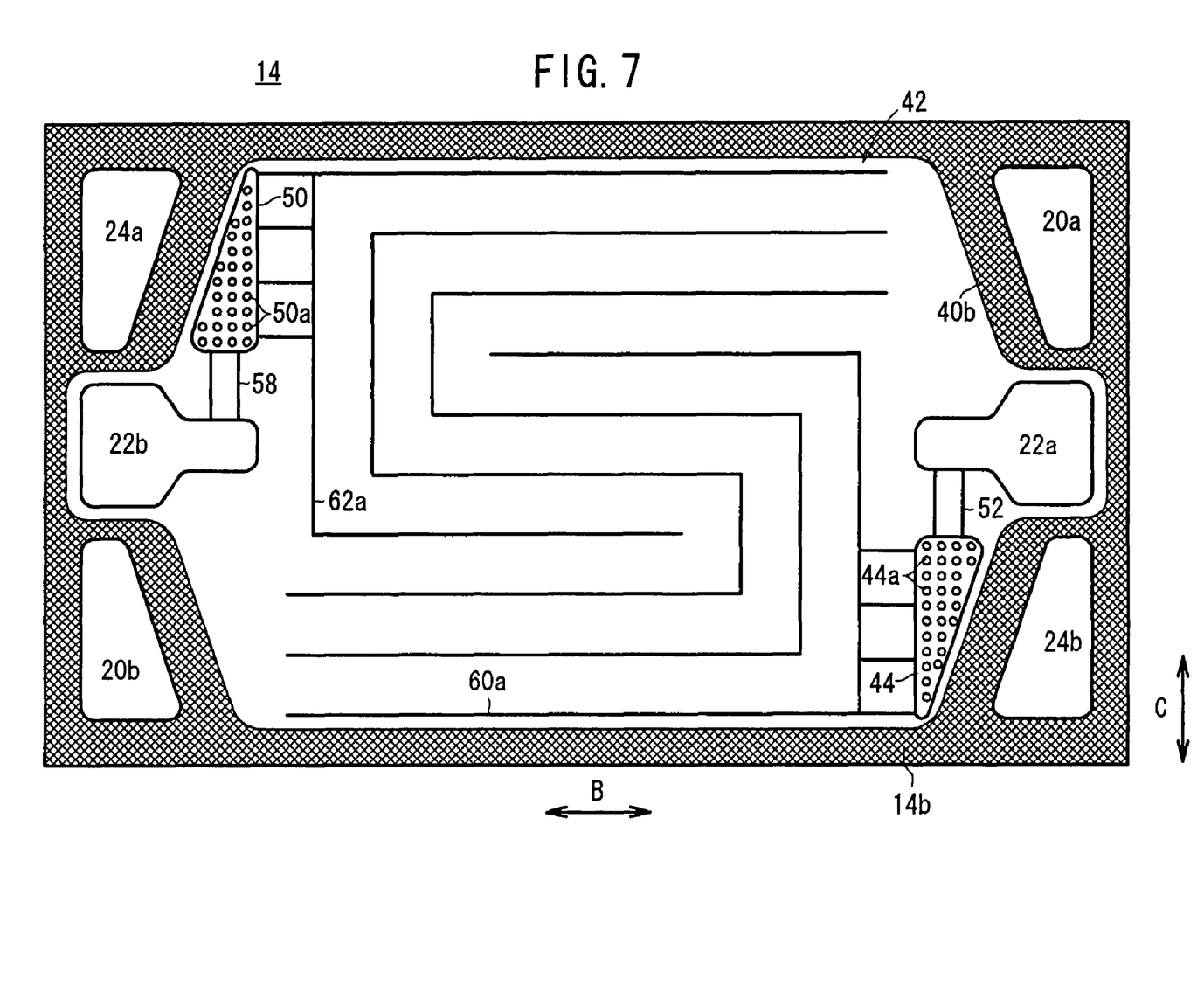
FIG. 7 is a view showing the other surface of the first metal plate.

As shown in FIG. 7, part of the coolant flow field 42 is formed on the surface 14b of the first metal plate 14 where the oxygen-containing gas flow field 32 is not formed on the surface 14a. Protrusions on the surface 14b formed by the oxygen-containing gas flow grooves 32a of the oxygen-containing gas flow field 32 on the surface 14a are not shown for ease of understanding. Likewise, in FIG. 8, protrusions on the surface 16a formed by grooves of a fuel gas flow field (reactant gas flow field) 66 (see FIG. 9) on the surface 16b are not shown.

The first inlet buffer 44 connected to the coolant supply passage 22a through the first inlet connection grooves 52, and the second outlet buffer 50 connected to the coolant discharge passage 22b through the second outlet connection grooves 58 are provided on the surface 14b. Further, on the surface 14b, grooves 60a as part of the straight flow grooves 60 extend in the direction indicated by the arrow B, and grooves 62a as part of the straight flow grooves 62 extend in the direction indicated by the arrow C.

On the surface 14b of the first metal plate 14, a planar seal 40b is formed around the coolant supply passage 22a, the coolant discharge passage 22b, and the coolant flow field 42 for preventing leakage of the coolant. The planar seal 40a and the planar seal 40b jointly make up a first seal member 40 which is formed integrally on the surfaces 14a, 14b of the first metal plate 14 to cover (sandwich) the outer edge of the first metal plate 14 (see FIG. 2).

Figure 8:
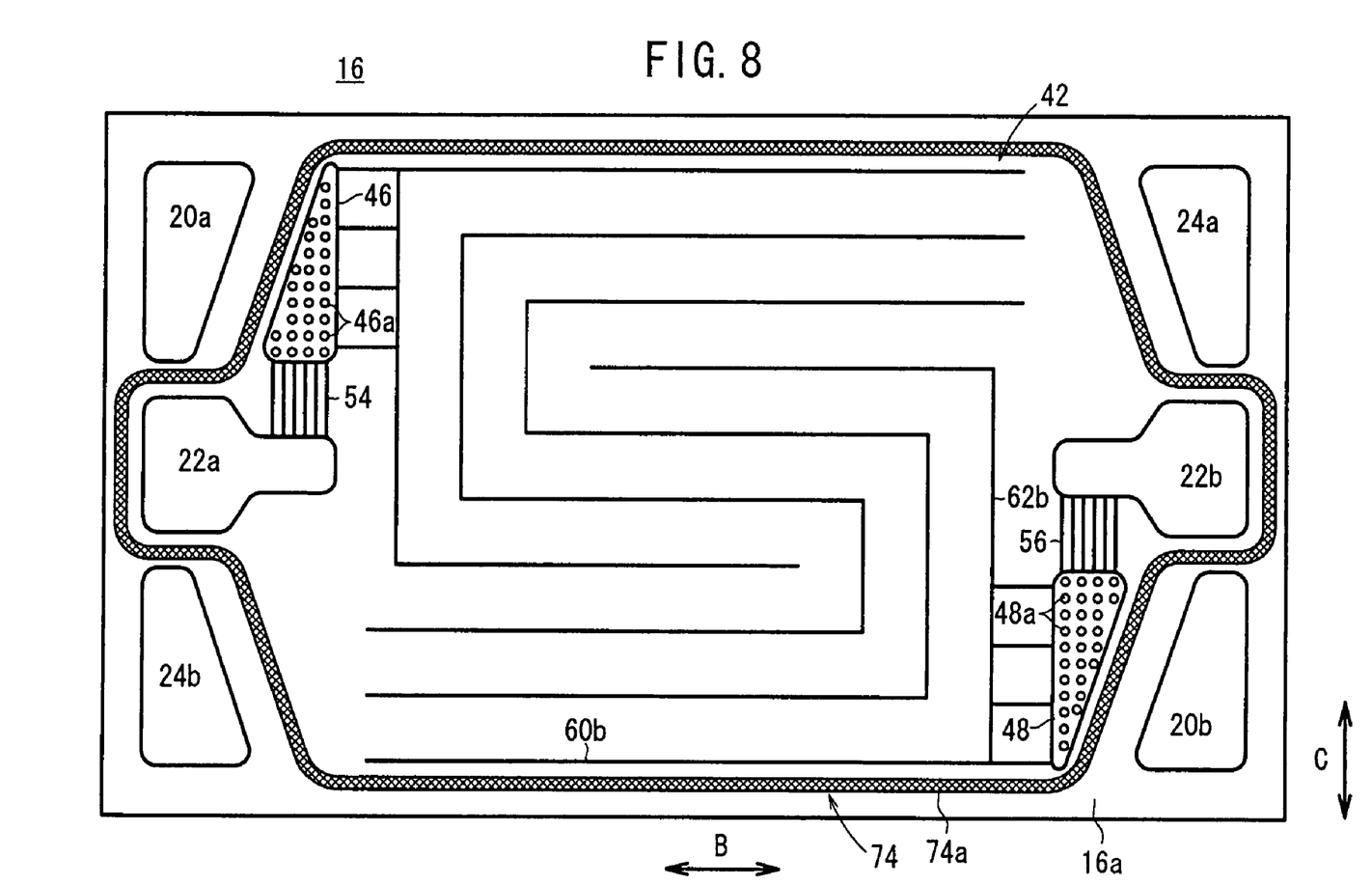
FIG. 8 is a view showing one surface of a second metal plate.

As shown in FIG. 8, part of the coolant flow field 42 is formed on the surface 16a of the second metal plate 16 where the fuel gas flow field 66 as described later is not formed on the surface 16b. Specifically, the second inlet buffer 46 connected to the coolant supply passage 22a, and the first outlet buffer 48 connected to the coolant discharge passage 22b are provided on the surface 16a.

Further, on the surface 16a, grooves 60b as part of the straight flow grooves 60 extend in the direction indicated by the arrow B, and grooves 62b as part of the straight flow grooves 62 extend in the direction indicated by the arrow C.

Figure 9:
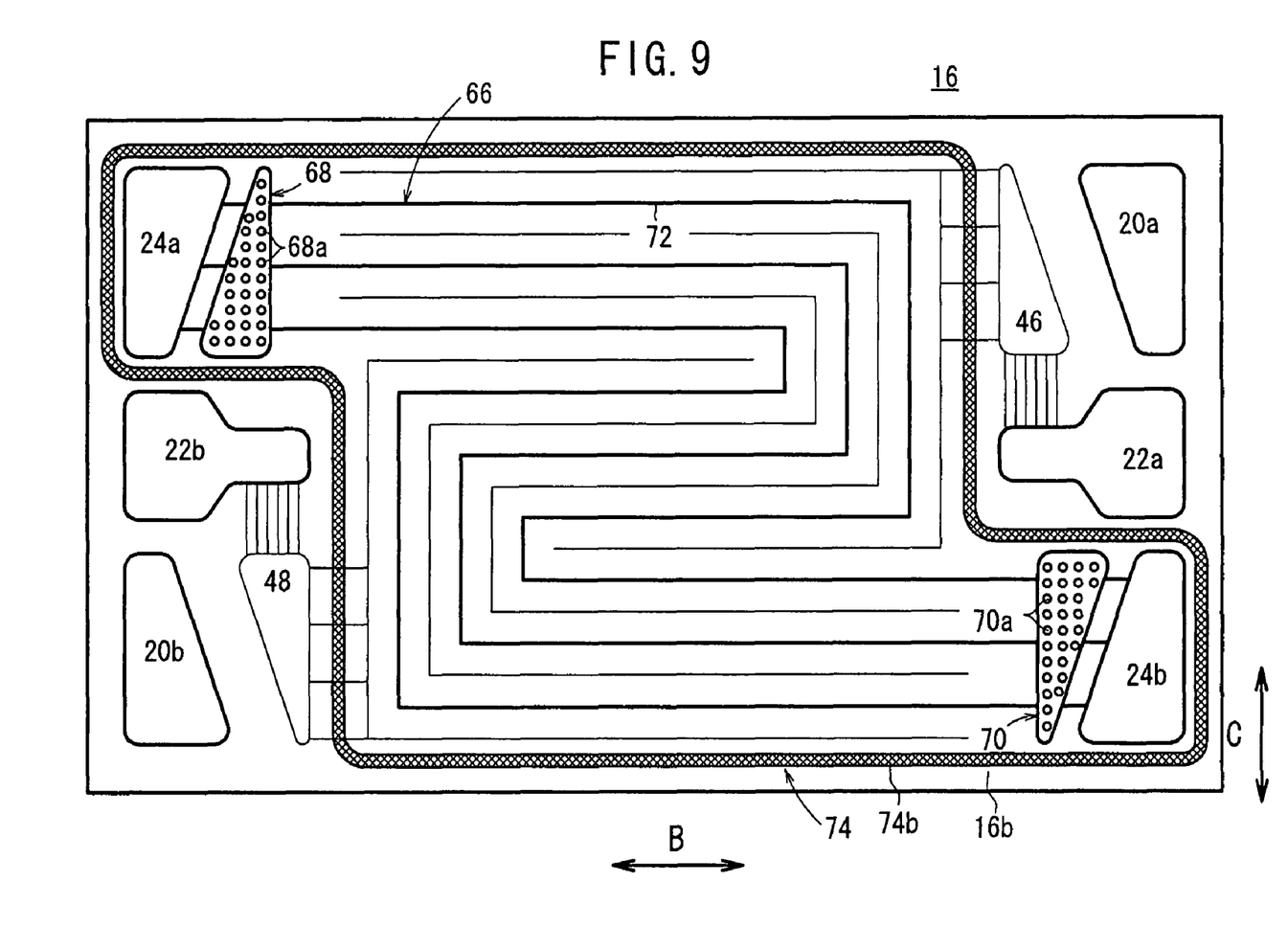
FIG. 9 is a view showing the other surface of the second metal plate.

As shown in FIG. 9, the second metal plate 16 has a fuel gas flow field 66 on its surface 16b facing the membrane electrode assembly 12. The fuel gas flow field 66 includes a substantially right triangular inlet buffer 68 provided near the fuel gas supply passage 24a, and a substantially right triangular outlet buffer 70 provided near the fuel gas discharge passage 24b.

The inlet buffer 68 and the outlet buffer 70 are substantially symmetrical with each other, and include a plurality of bosses 68a, 70a, respectively. The inlet buffer 68 and the outlet buffer 70 are connected by a plurality of fuel gas flow grooves 72 of the fuel gas flow field 66. The fuel gas flow grooves 72 extend in parallel with each other in a serpentine pattern for allowing the fuel gas to flow back and forth in the direction indicated by the arrow B, and flow in the direction indicated by the arrow C. The fuel gas flow grooves 72 of the fuel gas flow field 66 are serpentine grooves having an even number of, e.g., two turn regions in the surface 16b of the second metal plate 16.

A second seal member 74 is formed integrally on the surfaces 16a, 16b of the second metal plate 16 to cover (sandwich) the outer edge of the second metal plate 16. The second seal member 74 includes a line seal 74a formed on the surface 16a and a line seal 74b formed on the surface 16b. As shown in FIG. 8, the line seal 74a is formed around the coolant supply passage 22a, the coolant discharge passage 22b, and the coolant flow field 42 for preventing leakage of the coolant. As shown in FIG. 9, the line seal 74b is formed around the fuel gas supply passage 24a, the fuel gas discharge passage 24b, and the fuel gas flow field 66 for preventing leakage of the fuel gas.

The first and second metal plates 14, 16 have corrugated surfaces fabricated by press forming of thin plates. The oxygen-containing gas flow field 32, the coolant flow field 42, and the fuel gas flow field 66 are defined by the corrugated surfaces. Three fluid passages, i.e., the oxygen-containing gas supply passage 20a, the coolant supply passage 22a, and the fuel gas discharge passage 24b extend in the stacking direction through the first and second metal plates 14, 16 at one end, and the other three passages, i.e., the fuel gas supply passage 24a, the coolant discharge passage 22b, and the oxygen-containing gas discharge passage 20b extend in the stacking direction through the first and second metal plates 14, 16 at the other end.

In the first embodiment, folded sections 78 are formed around outer marginal regions of the first and second metal plates 14, 16 by press forming, and folded sections (described later) are formed around the fluid passages.

Specifically, as shown in FIG. 2, the second metal plate 16 has a folded section 80 which is formed around the coolant supply passage 22a by folding (bending) the second metal plate 16 in the stacking direction. That is, the folded section 80 of the second metal plate 16 of the fuel cell 10 is folded away from the first metal plate 14 of the adjacent fuel cell 10.

The coolant flow field 42 is formed between the adjacent fuel cells 10, and the folded section 80 defines an inlet 82 as an opening (fluid passage) between the coolant supply passage 22a and the coolant flow field 42. At the inlet 82, the sectional area of the opening is enlarged. Therefore, the coolant smoothly flows from the coolant supply passage 22a into the coolant flow field 42, and flows along the surfaces of the separator 13 in the direction indicated by the arrow B.

Likewise, the second metal plate 16 has a folded section (not shown) which is formed around the coolant discharge passage 22b, and which has the same structure as the folded section 80. The folded section defines an outlet (not shown) as an opening between the coolant flow field 42 and the coolant discharge passage 22b. At the outlet, the sectional area of the opening is enlarged.

As shown in FIG. 3, the first metal plate 14 has a folded section 84 which is formed around the oxygen-containing gas supply passage 20a by folding the first metal plate 14 in the stacking direction. The folded section 84 of the first metal plate 14 of the fuel cell 10 is folded away from the second metal plate 16 of the same fuel cell 10. The folded section 84 defines an inlet 86 as an opening between the oxygen-containing gas supply passage 20a and the oxygen-containing gas flow field 32. At the inlet 86, the sectional area of the opening is enlarged. Therefore, the oxygen-containing gas smoothly flows from the oxygen-containing gas supply passage 20a into the oxygen-containing gas flow field 32, and flows along the surface of the separator 13.

Likewise, the first metal plate 14 has a folded section (not shown) which is formed around the oxygen-containing gas discharge passage 20b. The folded section defines an outlet (not shown) as an opening between the oxygen-containing gas flow field 32 and the oxygen-containing gas discharge passage 20b. At the outlet, the sectional area of the opening is enlarged.

Further, folded sections (not shown) are also formed around the fuel gas supply passage 24a and the fuel gas discharge passage 24b by folding the first metal plate 14 or the second metal plate 16. The folded sections define an inlet and an outlet for enlarging the sectional area of the opening between the fuel gas supply passage 24a and the fuel gas flow field 66, and the sectional area of the opening between the fuel gas flow field 66 and the fuel gas discharge passage 24b.

In the first embodiment, the three fluid passages are arranged in the direction indicated by the arrow C at one end of the separator 13, and the three fluid passages are arranged at the other end of the separator 13. The folded sections may be formed only around the fluid passages at the middle positions of the opposite ends, i.e., only around the coolant supply passage 22a and the coolant discharge passage 22b.

Next, operation of the fuel cell 10 will be described.

As shown in FIG. 1, an oxygen-containing gas is supplied to the oxygen-containing gas supply passage 20a, a fuel gas such as a hydrogen-containing gas is supplied to the fuel gas supply passage 24a, and a coolant such as pure water, or ethylene glycol is supplied to the coolant supply passage 22a.

The oxygen-containing gas flows from the oxygen-containing gas supply passage 20a into the oxygen-containing gas flow field 32 of the first metal plate 14. As shown in FIG. 5, the oxygen-containing gas flows through the inlet buffer 34 temporarily, and is distributed into the oxygen-containing gas flow grooves 38 of the oxygen-containing gas flow field 32. The oxygen-containing gas flows through the oxygen-containing gas flow grooves 38 in a serpentine pattern along the cathode 30 of the membrane electrode assembly 12.

The fuel gas flows from the fuel gas supply passage 24a into the fuel gas flow field 66 of the second metal plate 16. As shown in FIG. 9, the fuel gas flows through the inlet buffer 68 temporarily, and is distributed into the fuel gas flow grooves 72 of the fuel gas flow field 66. The fuel gas flows through the fuel gas flow grooves 72 in a serpentine pattern along the anode 28 of the membrane electrode assembly 12.

Thus, in the membrane electrode assembly 12, the oxygen-containing gas supplied to the cathode 30, and the fuel gas supplied to the anode 28 are consumed in the electrochemical reactions at catalyst layers of the cathode 30 and the anode 28 for generating electricity.

After the oxygen-containing gas is consumed at the cathode 30, the oxygen-containing gas flows into the oxygen-containing gas discharge passage 20b through the outlet buffer 36 (see FIG. 1). Likewise, after the fuel gas is consumed at the anode 28, the fuel gas flows into the fuel gas discharge passage 24b through the outlet buffer 70 (see FIG. 9).

The coolant supplied to the coolant supply passage 22a flows into the coolant flow field 42 between the first and second metal plates 14, 16. As shown in FIG. 6, the coolant from the coolant supply passage 22a flows through the first and second inlet connection grooves 52, 54 in the direction indicated by the arrow C, and flows into the first and second inlet buffers 44, 46 temporarily.

The coolant is distributed from the first and second inlet buffers 44, 46, and flows through the straight flow grooves 60 horizontally in the direction indicated by the arrow B, and flows through the straight flow grooves 62 vertically in the direction indicated by the arrow C. Thus, the coolant is supplied to cool the entire power generation surface of the membrane electrode assembly 12. Then, the coolant flows through the first and second outlet buffers 48, 50 temporarily, and flows into the coolant discharge passage 22b through the first and second outlet connection grooves 56, 58.

In the first embodiment, as shown in FIG. 2, the second metal plate 16 has the folded section 80 formed by press forming around the coolant supply passage 22a extending through the fuel cell 10 in the stacking direction. Therefore, though the second metal plate 16 is a thin plate, with the simple structure, improvement in the rigidity of the portion around the coolant supply passage 22a is achieved, and it is possible to desirably reduce deformation such as warpage or distortion of the second metal plate 16 after press forming.

Further, the folded section 80 of the second metal plate 16 of the fuel cell 10 is folded away from the first metal plate 14 of the adjacent fuel cell 10 to define the inlet 82 which enlarges the sectional area of the opening between the coolant supply passage 22a and the coolant flow field 42.

Therefore, the coolant is smoothly supplied from the coolant supply passage 22a into the coolant flow field 42. Even if any misalignment or the like occurs between the fuel cells 10, sufficient sectional area at the inlet 82 is maintained, and thus, the flow of the coolant is not interrupted. Likewise, the folded section (not shown) is also formed around the coolant discharge passage 22b. Thus, improvement in the rigidity of the portion around the coolant discharge passage 22b is achieved effectively.

Further, as shown in FIG. 3, the first metal plate 14 has the folded section 84 around the oxygen-containing gas supply passage 20a. Therefore, improvement in the rigidity of the portion around the oxygen-containing gas supply passage 20a is achieved effectively.

Further, the folded section 84 defines the inlet 86 which enlarges the sectional area of the opening between the oxygen-containing gas supply passage 20a and the oxygen-containing gas flow field 32. Thus, the oxygen-containing gas is supplied smoothly and reliably from the oxygen-containing gas supply passage 20*a* to the oxygen-containing gas flow field 32 through the inlet 86. Even if any misalignment or the like occurs between the fuel cells 10, sufficient sectional area at the inlet 86 is maintained. Further, the folded section (not shown) is also formed around the oxygen-containing gas discharge passage 20*b*. Thus, the oxygen-containing gas is smoothly discharged from the oxygen-containing gas flow field 32 into the oxygen-containing gas discharge passage 20*b*, and improvement in the rigidity is achieved.

Further, the folded sections (not shown) are formed around the fuel gas supply passage 24*a* and the fuel gas discharge passage 24*b*, respectively. Thus, the fuel gas is smoothly supplied from the fuel gas supply passage 24*a* to the fuel gas flow field 66, smoothly discharged from the fuel gas flow field 66 to the fuel gas discharge passage 24*b*, and improvement in the rigidity is achieved.

Thus, in the first embodiment, when a plurality of the fuel cells 10 are stacked together to form the stack, uniform surface pressure distribution is achieved in each of the fuel cells 10. Further, the overall size and weight of the fuel cell 10 are reduced.

Further, in the first embodiment, at one end of the separators 13, three of the six fluid passages are arranged in the direction indicated by the arrow C, and at the other end of the separators 13, the other three fluid passages are arranged in the direction indicated by the arrow C. In the above description, the folded sections are formed around the six fluid passages. Alternatively, the folded sections may be formed only around the fluid passages at the middle positions, i.e., around the coolant supply passage 22*a* and the coolant discharge passage 22*b*. Simply by providing the folded sections around the fluid passages at the middle positions, improvement in the rigidity of the portions around the other fluid passages adjacent to the fluid passages at the middle positions may be achieved in some cases. If the folded sections are formed only around the fluid passages at the middle positions, since the folding process is not applied to the portions around the other fluid passages, the overall size and weight of the fuel cell 10 are reduced.

Figure 10:
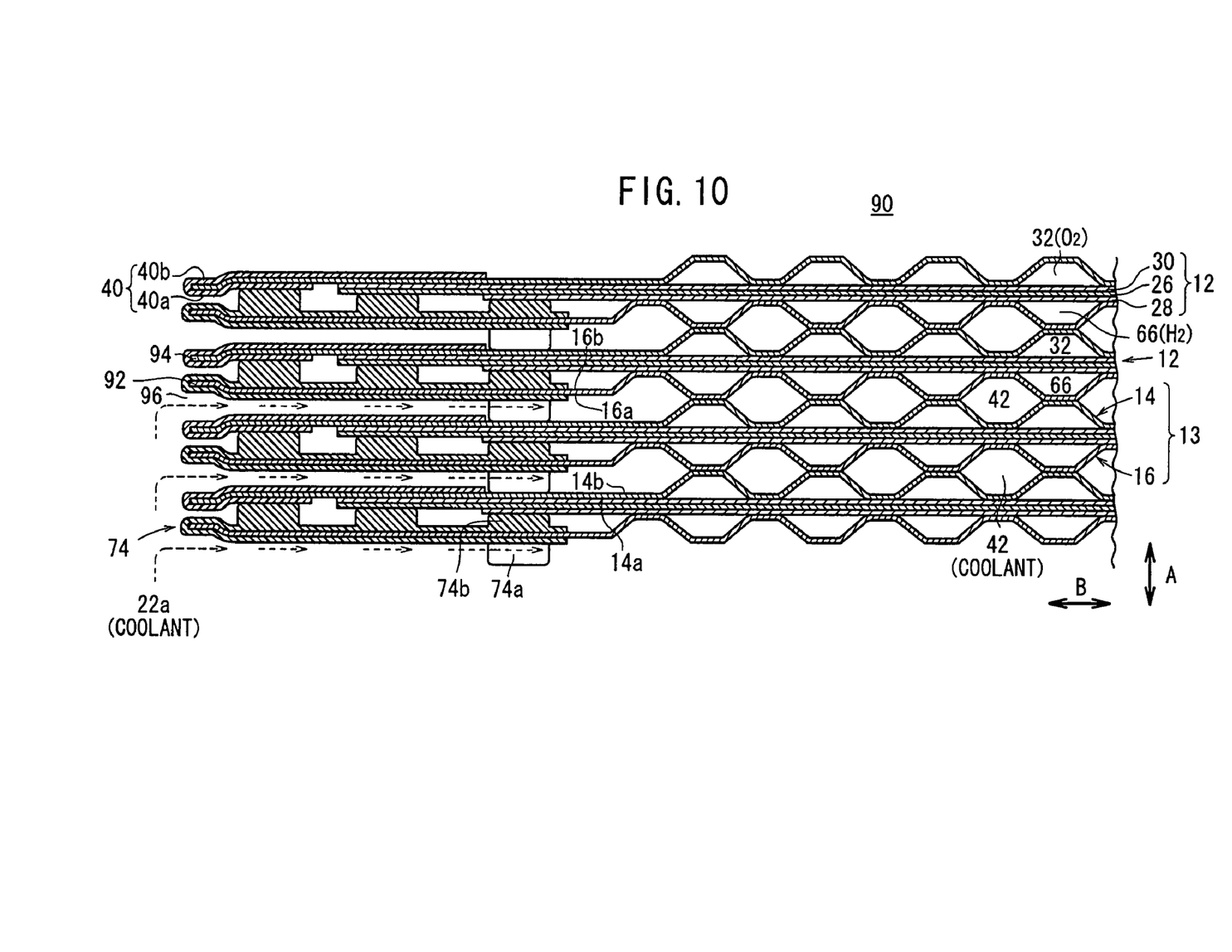
FIG. 10 is a cross sectional view showing part of a stack formed by stacking fuel cells according to a second embodiment of the present invention.

FIG. 10 is a cross sectional view showing part of a stack formed by stacking fuel cells 90 according to a second embodiment of the present invention. The constituent elements that are identical to those of the fuel cell 10 according to the first embodiment are labeled with the same reference numeral, and description thereof will be omitted.

In the second embodiment, the coolant flow field 42 is formed between a pair of the fuel cells 90 which are stacked together, i.e., between the first metal plate 14 of one fuel cell 90 and the second metal plate 16 of the other fuel cell 90. Folded sections 92, 94 are formed on both of the first and second metal plates 14, 16 around the coolant supply passage 22*a* by folding (bending) the first and second metal plates 14, 16, respectively in the stacking direction.

The folded sections 92, 94 are folded in the directions away from a contact plane between the first and second metal plates 14, 16. The folded sections 92, 94 jointly define an inlet 96 which enlarges the sectional area of the opening (fluid passage) between the coolant supply passage 22*a* and the coolant flow field 42 for allowing the coolant to flow smoothly from the coolant supply passage 22*a* to the coolant flow field 42.

Though not illustrated, the folded sections are also formed around the coolant discharge passage, the oxygen-containing gas supply passage, the oxygen-containing gas discharge passage, the fuel gas supply passage, and the fuel gas discharge passage. The folded sections of the first and second metal plates 14, 16 are folded away from each other by the folding process (press forming).

In the second embodiment, the folded sections 92, 94 are folded away from each other around the coolant supply passage 22*a*. Thus, the same advantages as with the first embodiment can be obtained. For example, even if the first and second metal plates 14, 16 are thin, deformation after press forming is reduced effectively, and thus, the sufficient cross sectional area at the inlet 96 is achieved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and a metal separator in a stacking direction, said electrolyte electrode assembly including a pair of electrodes, and an electrolyte interposed between said electrodes, wherein the metal separator is a thin, press-formed plate and a fluid passage extends through said metal separator in the stacking direction for allowing at least fluid comprising a reactant gas or a coolant to flow through said fluid passage;

an opening is provided between a first side of said metal separator and a first side of an adjacent separator, the opening serving as a passage for said fluid flowing from the fluid passage extending in the stacking direction into a flow field extending perpendicular to the stacking direction between the first side of the metal separator and the first side of the adjacent separator;

a folded section is provided around said fluid passage, and said folded section is formed by folding said metal separator in the stacking direction, wherein the metal separator is folded in the stacking direction away from the opening such that a sectional area of the opening is enlarged between the first sides at a point nearest to the fluid passage in comparison to a sectional area of the flow field extending perpendicular to the stacking direction at a point further from the fluid passage;

wherein three fluid passages are arranged at one end of said metal separator, and three fluid passages are arranged at the other end of said metal separator; and said folded section is provided around each side of only the middle fluid passage among said three fluid passages at each end of said metal separator at an outer marginal region of said metal separator such that no folded sections are provided around any side of the fluid passages other than the middle fluid passage.

2. A fuel cell according to claim 1, wherein a seal member is provided on said metal separator to cover an outer edge and an inner surface of said fluid passage of said metal separator.

3. A fuel cell stack comprising at least two fuel cells, said fuel cells each formed by stacking an electrolyte electrode assembly and a pair of metal separators, said electrolyte electrode assembly interposed between said metal separators, said electrolyte electrode assembly including a pair of electrodes, and an electrolyte interposed between said electrodes, a fluid passage extending through said metal separators in a stacking direction for allowing at least fluid comprising a reactant gas or a coolant to flow through said fluid passage;

wherein the metal separator is a thin, press-formed plate and a coolant flow field is formed between a metal separator of one of said fuel cells and an adjacent metal separator of another one of said fuel cells;

an opening is provided between a first side of said metal separator and a first side of said adjacent metal separator, the opening serving as a passage for said fluid flowing from the fluid passage extending in the stacking direction into a flow field extending perpendicular to the stacking direction between the first side of the metal separator and the first side of the adjacent separator;

a folded section is formed by folding said metal separator of said one of said fuel cells, and another folded section is formed by folding said adjacent metal separator;

wherein three fluid passages are arranged at one end of said metal separator, and three fluid passages are arranged at the other end of said metal separator;

said folded section is provided around each side of only the middle fluid passage among said three fluid passages at each end of said metal separator at an outer marginal region of said metal separator such that no folded sections are provided around any side of the fluid passages other than the middle fluid passage; and said folding sections are provided around said middle fluid passage and folded in directions away from a contact plane between said metal separators adjacent to each other such that a sectional area of the opening is enlarged.

* * * * *